United States Patent [19]

Yamauchi et al.

[11] Patent Number: 5,437,265
[45] Date of Patent: Aug. 1, 1995

[54] GAS HEATING APPARATUS

[75] Inventors: Yasuhiro Yamauchi; Akito Komori, both of Nagasaki, Japan

[73] Assignee: Mitsubishi Jukogyo Kabushiki Kaisha, Tokyo, Japan

[21] Appl. No.: 154,506

[22] Filed: Nov. 19, 1993

Related U.S. Application Data

[63] Continuation-in-part of Ser. No. 782,365, Oct. 24, 1991, abandoned.

[30] Foreign Application Priority Data

Oct. 30, 1990 [JP] Japan .................. 2-290876

[51] Int. Cl.$^6$ .............................. F24J 2/10
[52] U.S. Cl. .................. 126/657; 126/652; 126/680; 126/676; 126/690
[58] Field of Search ......... 126/680, 652, 656, 657, 126/684, 690, 676

[56] References Cited

U.S. PATENT DOCUMENTS

| | | | |
|---|---|---|---|
| 3,203,167 | 8/1965 | Green, Jr. | 126/684 X |
| 3,875,925 | 4/1975 | Johnston | 126/684 X |
| 3,998,206 | 12/1976 | Jahn | 126/690 X |
| 4,030,890 | 6/1977 | Diggs . | |
| 4,048,982 | 9/1977 | Pei | 126/676 |
| 4,129,117 | 12/1978 | Harvey | 126/684 X |
| 4,135,489 | 1/1979 | Jarvinen . | |
| 4,318,393 | 3/1982 | Goldstein . | |
| 4,328,792 | 5/1982 | Shores . | |
| 4,367,727 | 1/1983 | Llorach . | |
| 4,416,261 | 11/1983 | van der Aa . | |
| 4,873,061 | 10/1989 | O'Hare . | |

FOREIGN PATENT DOCUMENTS

| | | |
|---|---|---|
| 2296703 | 7/1976 | France . |
| 2649807 | 5/1987 | Germany . |
| 490446 | 8/1955 | Italy .................. 126/684 |
| 54-128842 | 10/1979 | Japan . |

OTHER PUBLICATIONS

Patent Abstracts of Japan, vol. 4, No. 45 (M-6) Apr. 9, 1980.
Patent Abstracts of Japan, vol. 15, No. 345 (C-86) Sep. 3, 1991.
Research Department Energetics, a Scientific Report of the German Aerospace Research Establishment (1990), p. 33.

Primary Examiner—Carl D. Price
Attorney, Agent, or Firm—Wenderoth, Lind & Ponack

[57] ABSTRACT

A radiant gas heating apparatus of the present invention includes a cylindrical member of a porous ceramic material adapted to be heated by radiation, and a flow passageway which directs gas radially through the pores of the ceramic material from one cylindrical surface of the cylindrical member to the other cylindrical surface thereof. A steam electrolyzing apparatus of the present invention includes a light focusing section having a porous ceramic member disposed within a transparent light-receiving section vessel, an electrolyzing cell having an oxygen electrode and a hydrogen electrode disposed on inner and outer surfaces of a cylindrical electrolyte, and a heat-insulating vessel covering the electrolyzing cell. In the steam electrolyzing apparatus, after low-temperature gas has passed through the space between the porous ceramic member and the light-receiving section vessel, the gas passes through the porous ceramic thereby being heated. The operation can occur under a pressurized condition because the mechanical strength of the light-receiving section vessel is not degraded as it is kept cool by the low-temperature gas flowing in the flow passageway.

5 Claims, 5 Drawing Sheets

GAS HEATING APPARATUS

This is a Continuation-In-Part of U.S. Ser. No. 07/782,365 filed Oct. 24, 1991 and now abandoned.

BACKGROUND OF THE INVENTION

Field of the Invention

The present invention relates to a radiation heating apparatus for heating gas with sunlight, with heat from a combustion furnace, and with exhaust gas or the like so that useful heat may be extracted.

The present invention also relates to a steam electrolyzing apparatus making use of radiation such as solar heat or the like, which is particularly useful in a sunlight-receiving section of a solar heat electric generator, in a working gas heating section of a solar heat-driven Stirling engine, and in a high-temperature heat exchanger of a high-temperature gas-cooled reactor (HTGR).

FIG. 7 shows a sunlight gas heating apparatus in the prior art. In this apparatus, sunlight 01 is received by an absorber plate 02, whereby liquid metal 03 existing on the rear surface of this absorber plate 02 is heated to generate liquid metal vapor 03′, and by means of this liquid metal vapor 03′, a heat-exchanger 04, through which heating gas is passing, is heated by the transmission of condensation heat. The entire gas heating apparatus is thermally insulated by heat-insulating material 05. It is to be noted that in this figure, reference numeral 06 designates an inlet through which gas to be heated is introduced, and numeral 06′ designates an outlet through which the heated gas is discharged.

Also, a steam electrolyzing apparatus such as that shown in FIG. 8 has been known (Japanese Patent Application No. 1989-271238).

In FIG. 8, steam is fed jointly with argon gas serving as carrier gas through a steam inlet pipe 003 into a light receiving section consisting of a porous ceramic member 002 contained in a quartz glass vessel 001. Steam heated up to 1000° C. by focused sunlight 004 in the porous ceramic member 002 is fed into an electrolyzing cell 005 formed of a cylinder of yttria-stabilized zirconia (hereinafter called YSZ). When a D.C. voltage is applied between a negative electrode 007 connected to a hydrogen electrode 006 made of platinum or YSZ cermet of nickel and a positive electrode 009 connected to an oxygen electrode 008 made of platinum or lanthanum type probschite type oxides ($LaCoO_3$, $LaMnO_3$, $LaCrO_3$, etc.) steam is electrolyzed, and hydrogen is produced on the side of the hydrogen electrode 006, while oxygen is produced on the side of the oxygen electrode 008. The produced oxygen is discharged to the outside through an oxygen outlet pipe 011 by the argon gas fed through a carrier gas inlet pipe 010. The electrolyzing cell 005 is covered by a heat-insulating vessel 012 for the purpose of maintaining the temperature within the cell 005 constant and also preventing the dissipation of heat. In addition, in order to maintain the temperature uniform, sometimes a porous ceramic member 013 is provided at the carrier gas inlet pipe 010 and at the oxygen outlet pipe 011. It is to be noted that reference numeral 014 designates a hydrogen outlet pipe extending through the porous ceramic member 002 and the quartz glass vessel 001 for discharging the produced hydrogen jointly with argon gas and residual steam.

The above-described sunlight gas heating apparatus in the prior art shown in FIG. 7 presented the following problems to be resolved. That is, in the above-described apparatus in the prior art, the liquid metal used as a heating medium is troublesome to handle, because the temperature to which the gas is heated is determined by the boiling point of liquid metal, it is difficult to heat the gas to various desired temperatures, and the layout of the apparatus is limited because of the fact that circulation of the liquid metal is effected by gravity.

Also, if the steam electrolyzing apparatus in the prior art shown in FIG. 8 were operated under a pressurized condition, the porous ceramic member would be heated to a high temperature. The mechanical strength of the quartz tube serving as a light receiving section vessel would be degraded because the porous ceramic member contacts the quartz tube. Thus, the apparatus cannot in fact be used under a pressurized condition.

SUMMARY OF THE INVENTION

It is therefore one object of the present invention to provide an improved radiant gas heating apparatus which is free from the above-described shortcomings in the prior art.

Another object of the present invention is to provide an improved steam electrolyzing apparatus, in which the temperature of a light-receiving section vessel is not raised. To achieve this object gas passes through a space between a light-receiving section vessel and a porous ceramic member before the gas is heated. Hence, the mechanical strength of the vessel is not degraded, and so, heating under a pressurized condition is possible.

According to one aspect of the present invention, the radiant gas heating apparatus comprises a porous ceramic member disposed to be heatable by radiation, and a flow passageway through which gas is movable from one side of the porous ceramic member to the other side thereof by passing through the porous ceramic of the member.

According to another aspect of the present invention, the steam electrolyzing apparatus comprises a light focusing section including a porous ceramic member disposed within a transparent light-receiving section vessel, an electrolyzing cell including an oxygen electrode and a hydrogen electrode disposed on inner and outer surface of a cylindrical electrolyte, and a heat-insulating vessel covering the electrolyzing cell. During operation, the porous ceramic member is heated by radiation, low-temperature gas is directed through the space between the porous ceramic member and the light-receiving section vessel, and subsequently the gas passes through the porous ceramic member so as to be heated to a high temperature under a pressurized condition.

Owing to the above-described features, the radiant gas heating apparatus according to the present invention offers the following advantages.

Generally, in the case of directly heating gas with radiation, since the emissivity of gas is small (0.2 to 0.3), the radiation heat flux is small and a heat transfer area becomes large. On the other hand, an emissivity of a solid is large (0.8 –0.9) as compared to gas, and so, a heat transfer area can be made smaller in the case where after the solid has been heated with radiation, a gas is heated by convection (heat transfer from the solid to the gas). Therefore, the present invention employs porous ceramics for the member to be heated (porosity: 0.6–0.98) so that the porosity is large enough that the ceramic member has a large coefficient of heat transfer, a large heat transfer area and exhibits a small transit pressure loss of gas. Consequently, even though the porous ceramic member may have a small volume, it can transfer a lot of heat to the gas.

The flow passageway of the gas heating apparatus directs the gas through the ceramic material of the porous ceramic member from one side of the porous ceramic member to the other side thereof. Thus, the heat will be efficiently extracted by the gas.

Also, because a porous ceramic is used instead of liquid metal as a heating medium, the heating temperature of the apparatus is not limited by the boiling point of the heating medium.

In addition, since the exchange of heat does not rely upon the circulation of liquid metal, but is effected by gas directly passing through a porous ceramic member, the exchange of heat is hardly influenced by gravity. Accordingly, the apparatus may be arranged and oriented with a high degree of freedom.

Furthermore, in the steam electrolyzing apparatus according to the present invention, because cold gas passes through a space between a porous ceramic member and a transparent light-receiving section vessel made of quartz or the like before being heated, the light-receiving section vessel is cooled by the cold gas, and the temperature of the light-receiving section vessel will not be raised. In addition, the light-receiving section vessel and the cold gas have high transmissivities for sunlight, and so, they are hardly heated directly by sunlight or by secondary radiation from the porous ceramic member. Hence, according to the present invention, even if gas is heated to a high temperature of 1000° or higher under a pressurized condition, the mechanical strength of the light-receiving section vessel will not degrade because the temperature of the vessel is not raised.

The above-mentioned and other objects, features and advantages of the present invention will become more apparent by referring to the following description of preferred embodiments of the invention made in conjunction with the accompanying drawings.

DETAILED DESCRIPTION OF THE PREFERRED EMBODIMENTS

Figure 1:
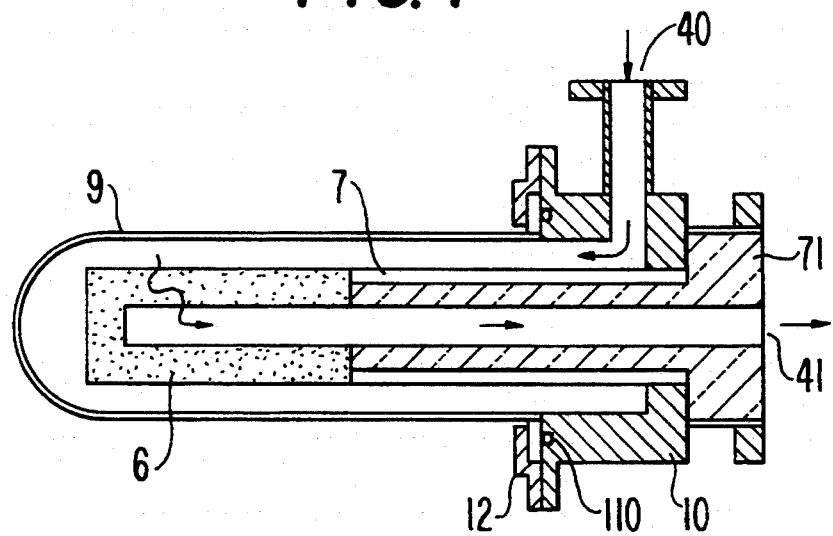
FIG. 1 is a longitudinal cross-sectional view of an essential part of a first preferred embodiment of a gas heating apparatus according to the present invention.

Now the first preferred embodiment of the gas heating apparatus according to the present invention will be described with reference to FIGS. 1 and 2. Referring first to FIG. 1, a cylinder 6 made of porous ceramics and having one end closed is mounted to an alumina tube 7, whose inside is thermally insulated by a heat-insulating material 71, by means of an inorganic group adhesive. The porous ceramics is alumina, SiC, zirconia or the like having a porosity of 60–98%, and a surface area of 500–3000 $m^2/m^3$. The average diameter of the pores is at most 5 mm. This assembly is mounted in a transparent vessel (quartz glass tube) 9, which is in turn mounted to a main body 10 of metal by means of an O-ring 110 and a metal fitting 12, as shown in the figure.

Heated gas is fed through a gas inlet 40 into a space between the quartz glass tube 9 and the porous ceramic cylinder 6. After the gas has passed through a flow passageway formed between the quartz glass tube 9 and the porous ceramic cylinder 6, it passes through the pores of the porous ceramic cylinder 6, which define twisted paths between the outer and inner surfaces of the cylinder 6 as illustrated by the arrows in FIG. 1, and flows in the alumina tube 7. From there, the gas is discharged from a gas outlet 41 provided at an end portion of the heat-insulating material 71. As shown in FIG. 2, this heating unit is mounted in a heat-insulating material 5 and a spherical reflector plate 13. The plate 13 is a curved surface having an optical axis coincident with the central longitudinal axis of cylinder 6, the cylinder being disposed at the focal point of the reflector plate 13 as shown in the figure.

Next, the operation of the above embodiment will be described.

Figure 2:
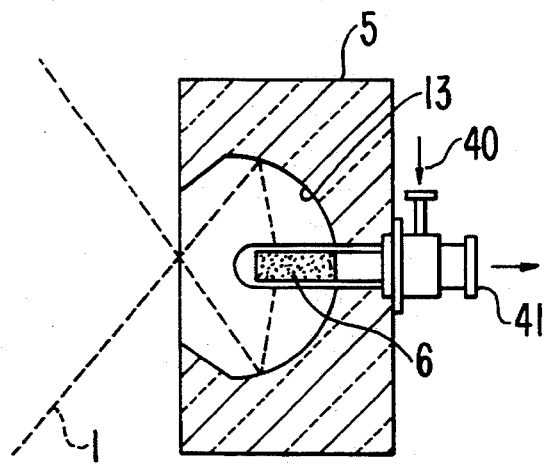
FIG. 2 is a vertical cross-sectional view of the above-mentioned first preferred embodiment.

In FIG. 2, if sunlight 1 is focused by a parabolic reflection mirror through an opening of the reflector plate 13, the porous ceramic cylinder 6 is heated by the sunlight 1, and when gas enters through a gas inlet 40, passes through the flow passageway between the quartz glass tube 9 and the porous ceramic cylinder 6, and passes through the porous ceramic cylinder 6, the gas is heated by the porous ceramic cylinder 6. Then the heated gas flows out through the gas outlet 41, thereby supplying heat to the outside. When the radiant gas heating apparatus according to the illustrated embodiment is employed, since a heat resistance of the porous ceramic is extremely high, there is an advantage in that gas can be heated up to a temperature of 1000° C. to 2000° C. by the focused sunlight. It is to be noted that the limit of heating is determined by a heat resistant temperature of the porous ceramic. Furthermore, owing to the fact that gas at a low temperature flows through the flow passageway between the quartz glass tube 9 and the porous ceramic cylinder 6, the quartz glass tube 9 is cooled and its temperature does not rise.

Next, a first preferred embodiment of a laser system according to the present invention will be described with reference to FIG. 3.

Figure 3:
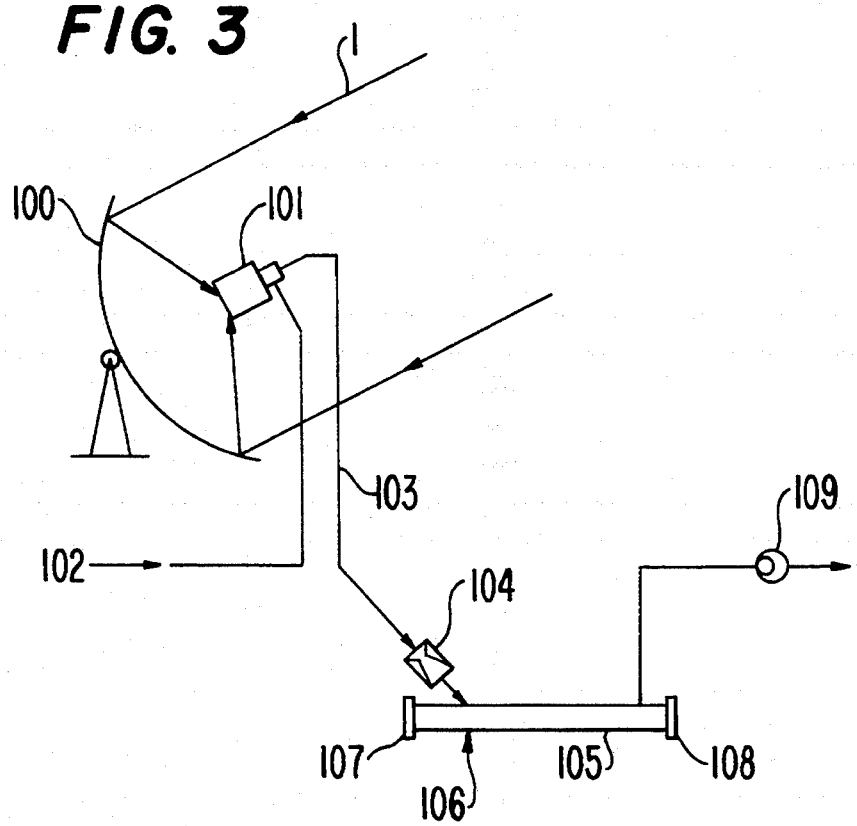
FIG. 3 is a schematic layout of a first preferred embodiment of a laser system according to the present invention which employs the gas heating apparatus of FIG. 1.

FIG. 3 illustrates a $CO_2$ gas dynamic laser system making use of sunlight 1. In this system, $N_2$ gas is heated from 1000° C. to 1400° C. by making use of a radiant gas heating apparatus 101 in the form of the first preferred embodiment of the present invention described above. Then the gas is accelerated in a nozzle 104 and mixed with $CO_2$ gas within a dynamic gas laser 105 to generate laser oscillation. The apparatus is constructed in such manner that $N_2$ gas and $CO_2$ gas within the $CO_2$ gas dynamic laser 105 may be exhausted to the outside of the $CO_2$ gas dynamic 105 by means of a vacuum pump 109. It is to be noted that reference numeral 107 designates a reflection mirror for the laser, and numeral 108 designates an output side reflection mirror.

Explaining now the operation of the above-described system, the radiant gas heating apparatus 101 is disposed at a focal point of a solar heat condenser 100, and $N_2$ gas 102 is fed to this apparatus 101. As in the embodiment of FIG. 2, the condenser 100 has a curved reflective surface having an optical axis coincident with the longitudinal axis of the cylindrical member of the apparatus 101, sunlight 1 being focused onto the cylindrical member. The condenser 100 can comprise a parabolic mirror. High-temperature $N_2$ gas 103 heated up to 1000° C. or higher is fed to the nozzle 104, where it is accelerated, and it is mixed with $CO_2$ gas 106 within the $CO_2$ gas dynamic laser 105, and laser oscillation is generated by exciting the $CO_2$ gas 106.

According to the illustrated embodiment, the power output is proportional to the temperature of the high-temperature $N_2$ gas 103, and there is an advantage in that since a high temperature can be easily realized if the sunlight 1 is used, a high power output can be obtained.

Next, a second preferred embodiment of the laser system according to the present invention will be described with reference to FIG. 4. It is to be noted that members similar to those of the above-described embodiment are designated by like reference numerals, and a further description thereof will be omitted.

Figure 4:
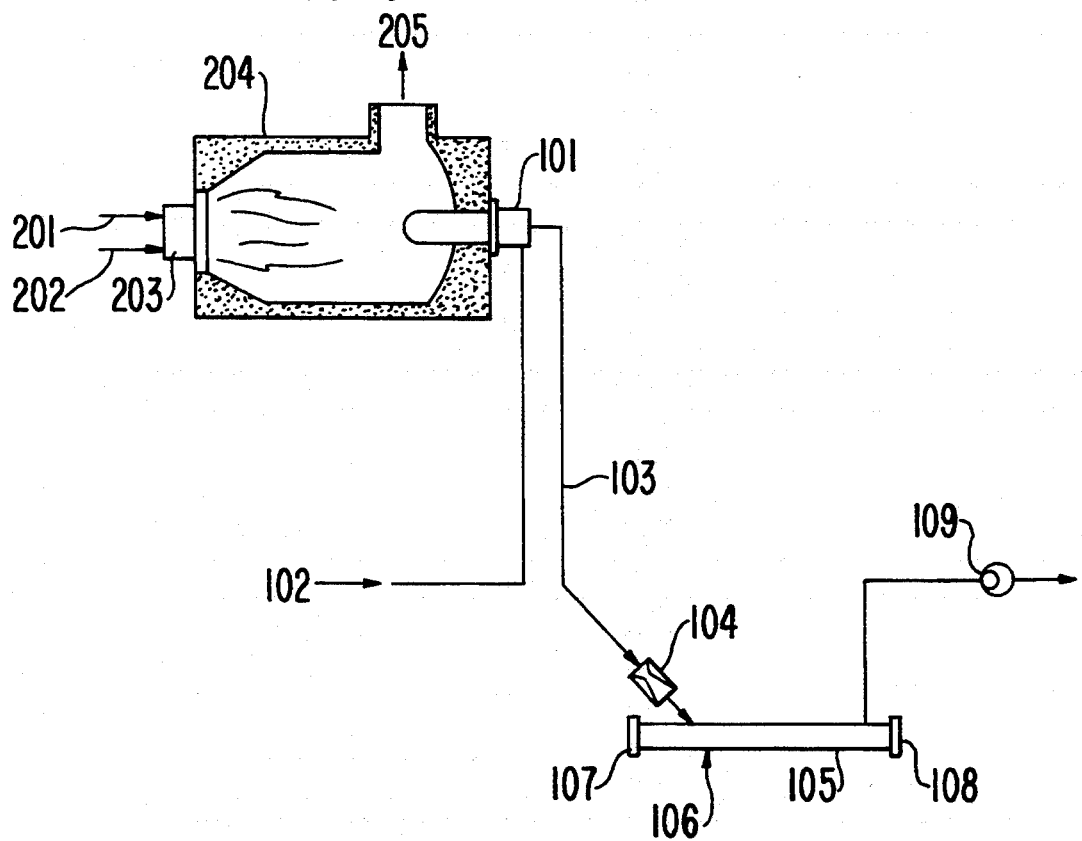
FIG. 4 is a schematic layout of a second preferred embodiment of a laser system according to the present invention.

FIG. 4 is an illustration of a combustion heating type $CO_2$ gas dynamic laser system. This system is constructed in such a manner that fuel 201 such as propane, LNG or the like is used as a heating source for $N_2$ gas, a radiation gas heater 101 is disposed within a combustion furnace 204, in which the fuel is burnt with air 202 by means of a burner 203 to heat the $N_2$ gas, and then the $N_2$ gas 103 is accelerated by a nozzle 104 and mixed with $CO_2$ gas within a $CO_2$ gas dynamic laser 105 so that laser oscillation can be effected. In contrast to the fact that in the first preferred embodiment of the laser system the sunlight was used as a heating source, this second preferred embodiment differs only in that fuel is used, and the remaining structure and operation are similar to those of the second preferred embodiment.

Because the interior of the radiation gas heater 101 is sealed by a quartz glass tube 9, $N_2$ gas to be heated and combustion gas serving as a heating gas do not mix with each other. Hence, even if heating is effected by means of the combustion gas, the impure combustion gas will not mix with the $N_2$ gas, and good laser oscillation is generated. This preferred embodiment has merit in that even at a place where sunlight is not available, the laser can easily output a high amount of power.

According to the above-described embodiments of the present invention, because a porous ceramic cylinder 6 is heated by the sunlight 1 or radiation heat in a combustion furnace 204 and heat is taken out by making general gas, $N_2$ gas or the like flow (penetrate) through a porous ceramic cylinder 6, there is an advantage in that a high temperature can be obtained in an extremely efficient manner as compared to the prior art in which the liquid metal limits the high temperature which can be obtained to its boiling point. As a result, a high power output can be obtained.

In addition, because a porous ceramic cylinder 6 is employed as the thermal medium, the operation of the apparatus is almost not influenced by gravity. Accordingly, the arrangement and orientation of the apparatus can be chosen relatively freely.

Figure 5:
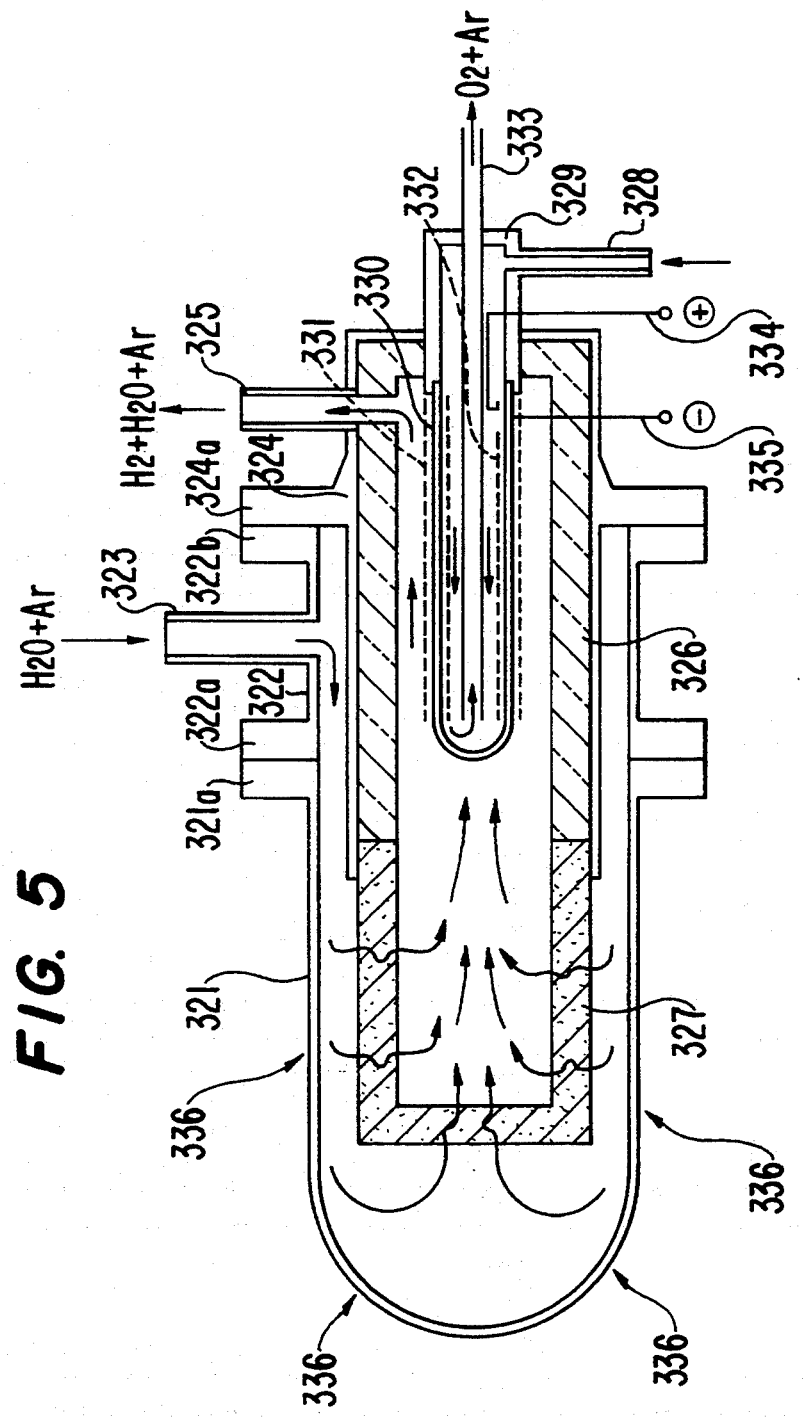
FIG. 5 is a longitudinal cross-sectional view of a first preferred embodiment of a steam electrolyzing apparatus according to the present invention.

Now a first preferred embodiment of a steam electrolyzing apparatus according to the present invention will be described with reference to FIG. 5. In this figure, reference numeral 321 designates a light-receiving section vessel made of quartz glass having one end (on the right side) opened and having a flange 321a mounted to this open end. On the opening side of this light-receiving section vessel 321 is fixed an outer cylinder 322 having its opposite ends opened and provided with flanges 322a and 322b at the respective ends. The flange 322a abuts a flange 321a of the light-receiving section vessel 321. The above-described outer cylinder 322 is provided with a steam inlet pipe 323 through which $H_2O + Ar$ is fed. To the above-mentioned outer cylinder 322 is fixed an inner cylinder 324 having a flange 324a. The flange 324a abuts the flange 322b of the outer cylinder 322. The end (on the left side) of a main body of the aforementioned inner cylinder 324 extends beyond the right end portion of the above-described light-receiving section vessel 321. In the above-described inner cylinder 324 is provided a hydrogen outlet pipe 325.

Inside the main body of the inner cylinder 324 is provided a heat-insulating vessel 326. The heat-insulating vessel 326 covers an electrolyzing cell 330, which will be described later, for the purpose of maintaining the temperature within the electrolyzing cell 330 constant and preventing thermal diffusion. In addition, at the left end portion of the main body of the inner cylinder 324 is disposed a porous ceramic member (light-receiving section) 327 contiguous with the end of the heat-insulating vessel 326 such that most of the member 327 is located on one side of the light-receiving section vessel 321. At the right end portion of the inner cylinder 324 is provided an opening, and a cylinder member 329 having a carrier gas inlet pipe 328 is mounted to this opening and an opening of the heat-insulating vessel 326. At one end portion (on the left side) of the cylinder member 329 is an electrolyzing cell 330 which is made of material pervious to $O_2$ ions (ion conductive material). The cylinder member 329 has one open end (the right end). Along the outside of this electrolyzing cell 330 is provided a hydrogen electrode 331, and along the inside thereof is provided an oxygen electrode 332. At the right end portion of the cylinder member 329 is provided an opening, and at this opening is mounted an oxygen outlet pipe 333 extending to a location proximate the left end portion of the electrolyzing cell 330. It is to be noted that in FIG. 5, reference numeral 334 designates a positive electrode connected to the oxygen electrode 332, numeral 335 designates a negative electrode connected to the hydrogen electrode 331, and numeral 336 designates focused sunlight.

The steam electrolyzing apparatus operates as follows.

At first, steam is fed jointly with argon serving as a carrier gas from the steam inlet pipe 323 into the light-receiving section (327). Here, the porous ceramic member 327 has been heated up by the focused sunlight 336, and so, when the steam and argon gas pass through the porous ceramic member 327 along the twisted passageways shown by the arrows, they are heated by the porous ceramic member 327 and their temperature is raised to about 1000° C.

The heated steam is fed to the electrolyzing cell 330, and if a D.C. voltage is applied to the negative electrode 335 connected to the hydrogen electrode 331 of the electrolyzing cell 330 and the positive electrode 334 connected to the oxygen electrode 332, steam is electrolyzed, and hydrogen is produced on the side of the hydrogen electrode 331, while oxygen is produced on the side of the oxygen electrode 332. The produced oxygen is carried by the argon gas fed through the carrier gas inlet pipe 328 and is exhausted to the outside through the oxygen outlet pipe 333.

In the steam electrolyzing apparatus of the present invention, cold gas passes through the space between the porous ceramic member 327 and the light-receiving section vessel 321 made of quartz glass. Thus, the light-receiving section vessel 321 is cooled by the cold gas, and so, the temperature of the light-receiving section vessel 321 is not raised. In addition, the light-receiving section vessel 321 and the cold gas exhibit a high transmissivity of sunlight, and so, they are hardly heated directly by the sunlight or by secondary radiation of the porous ceramic member 327. Hence, according to the present invention, because the temperature of the light-receiving section vessel 321 will not rise even if gas is heated up to a high temperature of 1000° C. or higher under a pressurized condition, the mechanical strength of the light-receiving section vessel will not degrade.

It is to be noted that in the above-described embodiment, porous ceramic could be provided in the carrier gas inlet pipe 328 and the oxygen outlet pipe 333 for the purpose of making the temperature uniform through the apparatus.

Figure 6:
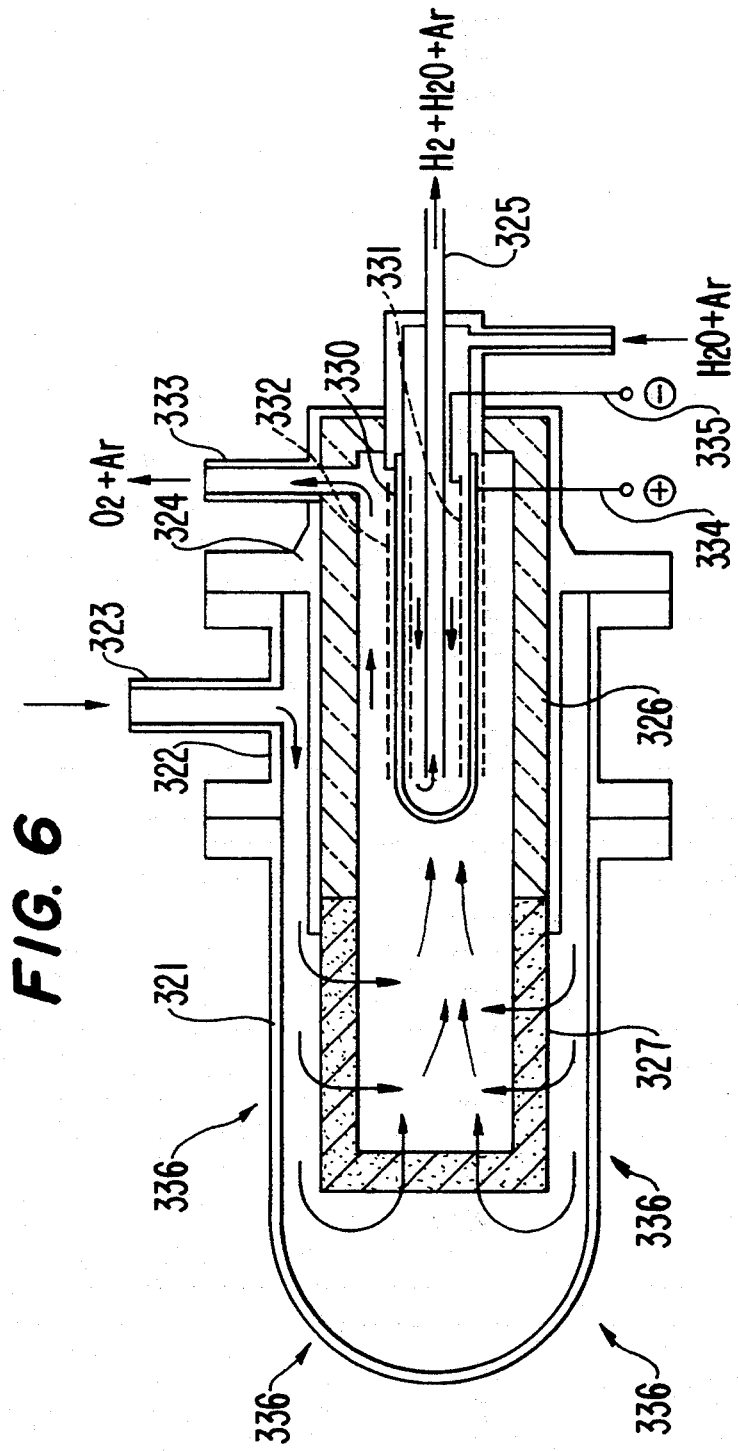
FIG. 6 is a longitudinal cross-sectional view of a second preferred embodiment of a steam electrolyzing apparatus according to the present invention.
Figure 7:
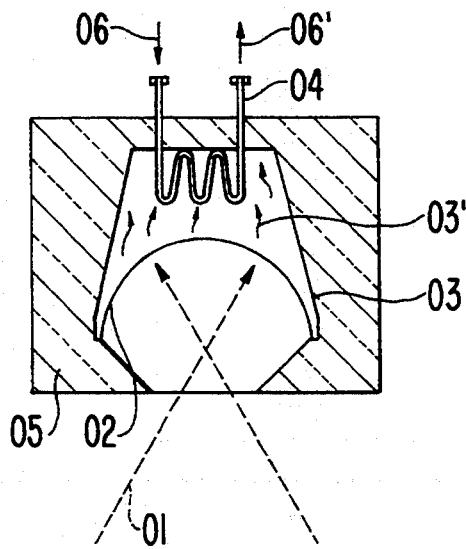
FIG. 7 is a longitudinal cross-sectional view of a radiant gas heating apparatus in the prior art.
Figure 8:
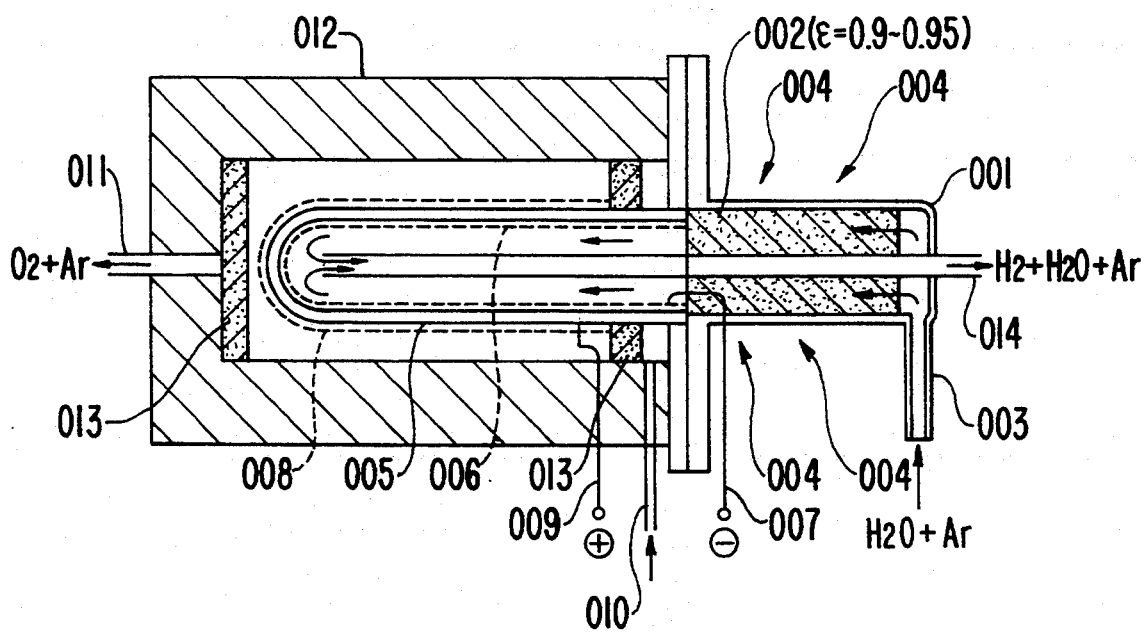
FIG. 8 is a vertical cross-sectional view of a steam electrolyzing apparatus in the prior art.

Next, a second preferred embodiment of a steam electrolyzing apparatus according to the present invention will be described with reference to FIG. 6. As shown in FIG. 6, this preferred embodiment is different from the above-described embodiment in that an oxygen electrode 332 made of material pervious to $O_2$ ions (ion conduction material) is mounted to the outside of the electrolyzing cell 330, while a hydrogen electrode 331 is mounted to the inside of the electrolyzing cell 330. In this way, air is heated by sunlight, and the electrolyzing cell 330 is heated by sensible heat.

According to this embodiment, like the embodiment described above, heating under a pressurized condition is possible.

As will be apparent from the detailed description of the preferred embodiments of the present invention above, in the radiant gas heating apparatus according to the present invention, since a porous ceramic member is used as a thermal medium rather than liquid metal, the heating temperature is not limited practically speaking. Further, a high temperature, that is, a high power output, can be obtained.

In addition, because a thermal medium, such as liquid metal which must be circulated, is not used, the arrangement and attitude of the apparatus can be arbitrarily chosen.

Also, in the steam electrolyzing apparatus according to the present invention, owing to the fact that gas is made to flow through a space between a light-receiving section vessel and a porous ceramic member before the gas is heated, the temperature of the light-receiving section vessel is not raised and a mechanical strength thereof is not degraded. Therefore, heating under a pressurized condition is possible.

While a principle of the present invention has been described above in connection with a number of preferred embodiments of the invention, it is intended that all matter contained in the above description and illustrated in the accompanying drawings be interpreted as illustrative of and not as a limitation on the scope of the invention.

What is claimed is:

1. A radiant gas heating apparatus comprising: a member of porous ceramic material heatable by a source of radiation, said member having a cylindrical portion, a portion closing one end of said cylindrical portion, and an open end opposite said one end, the porous ceramic material constituting said member having a porosity of 60-98% and a surface area of 3000 $m^2/m^3$, the pores of the ceramic material having an average diameter of no more than 5 mm, and the pores defining twisted passageways through the member which place the outer surface of the member in communication with the inner surface thereof; a transparent light-receiving vessel extending around said member and spaced from the outer surface thereof such that a flow passageway is defined between the outer surface of said member and an inner surface of said vessel, said flow passageway directing gas to be heated to the pores of said member so that the gas will pass through said member from the outer surface to the inner surface of the member; and a tube supporting said member at said open end thereof and having a passageway open to the interior of said member such that the gas which has passed from said flow passageway through the pores of said member of porous ceramic material will flow from the interior of said member into said tube.

2. The radiant gas heating apparatus as claimed in claim 1, wherein said light-receiving vessel is a quartz glass tube.

3. The radiant gas heating apparatus as claimed in claim 1, wherein said member of porous ceramic material is only supported in the apparatus at the open end thereof.

4. The radiant gas heating apparatus as claimed in claim 1, and further comprising a reflector having a curved reflective surface having an optical axis coincident with the central longitudinal axis of the cylindrical portion of said member of porous ceramic material, said member being disposed at the focal point of said reflector.

5. The radiant gas heating apparatus as claimed in claim 4, wherein said reflector is a parabolic mirror.

* * * * *